F. E., H. J. & U. S. EBERHARDT.
CLUTCH CONTROLLING MECHANISM.
APPLICATION FILED NOV. 22, 1913.
1,181,652.
Patented May 2, 1916.
2 SHEETS—SHEET 1.
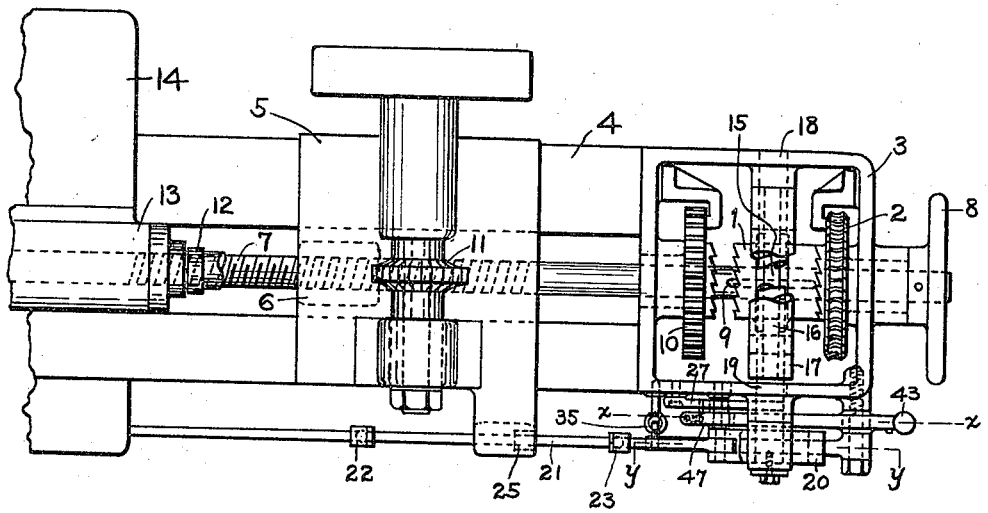
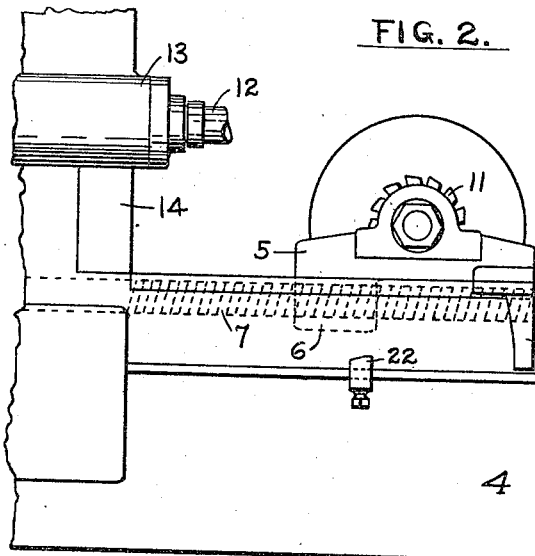
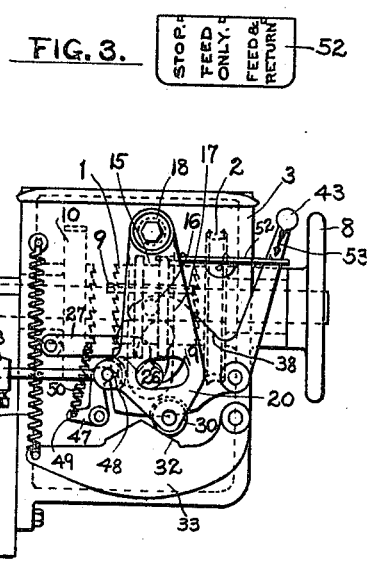
WITNESSES:
Charles L. Meyer
Albert A. Forster
INVENTORS
Frank E. Eberhardt.
Henry J. Eberhardt.
U. Seth Eberhardt.
BY
Fred'k F. Schuck
ATTORNEY

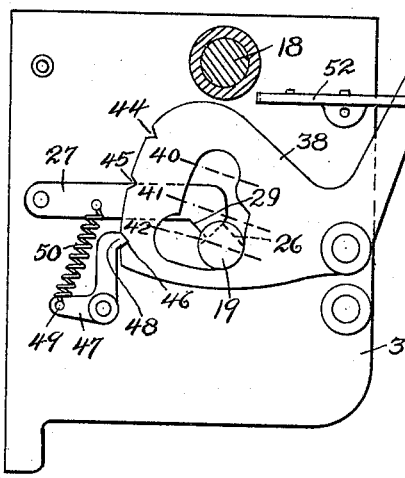
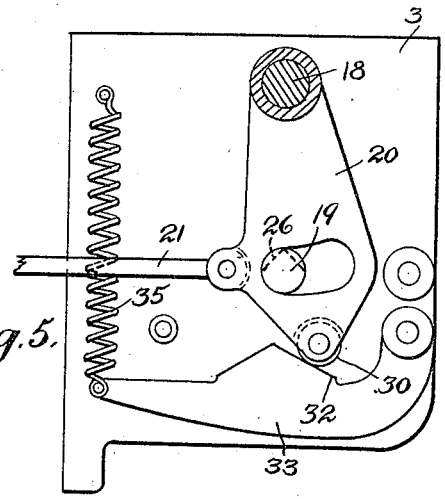
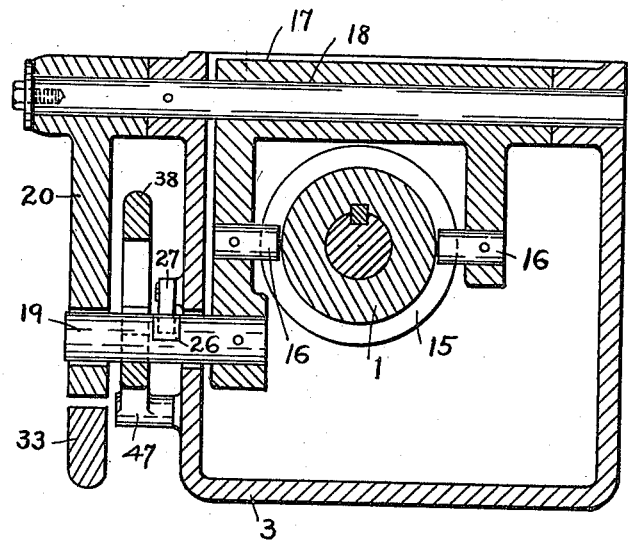

UNITED STATES PATENT OFFICE.

FRANK E. EBERHARDT, HENRY J. EBERHARDT, AND ULRICH SETH EBERHARDT, OF NEWARK, NEW JERSEY, ASSIGNORS TO NEWARK GEAR CUTTING MACHINE CO., OF NEWARK, NEW JERSEY, A CORPORATION OF NEW JERSEY.

CLUTCH-CONTROLLING MECHANISM.

1,181,652.     Specification of Letters Patent.     Patented May 2, 1916.

Application filed November 22, 1913. Serial No. 802,435.

*To all whom it may concern:*

Be it known that we, FRANK E. EBERHARDT, HENRY J. EBERHARDT, and ULRICH SETH EBERHARDT, citizens of the United States, and residents of Newark, in the county of Essex and State of New Jersey, have invented certain new and useful Improvements in Clutch-Controlling Mechanism, of which the following is a specification.

The invention relates to the transmission of power in machinery, and more particularly to the means of controlling the power passing through two trains of mechanism.

It has for its object to provide simplified means to control the power passing through two trains of mechanism and in such a manner that, by manually operating a lever, a desired sequence of operations may be effected.

The nature of the invention will be best understood when described in connection with the accompanying drawings, in which—

Figure 1 is a plan view of the invention as applied to a gear cutting machine; and Fig. 2 is a side elevation thereof. Fig. 3 is a fragmentary plan view showing an index plate for indicating the positions of the clutch controlling hand lever. Fig. 4 is a part section on an enlarged scale and taken on the line $x-x$, Fig. 1. Fig. 5 is a similar section taken on the line $y-y$, Fig. 1. Fig. 6 is a vertical cross-sectional view through the shaft 18 and other parts.

Similar characters of reference designate corresponding parts throughout the several views.

Referring to Figs. 1 and 2 of the drawings, 1 designates the sliding or adjustable member of a clutch of well-known construction, and which, in the position shown, is in engagement with the coacting clutch portion of a worm wheel 2 of one of the power transmitting trains, said worm wheel being rotatably mounted in a casing or feed box 3. The latter is secured to the frame 4 of a gear cutting machine, and upon which frame is slidably mounted the cutter carriage 5. Power to reciprocate said cutter carriage is imparted thereto through a nut 6 thereof and a screw 7 engaging said nut, the screw being arranged to be rotated by a hand wheel 8 or through the action of the clutch member 1 keyed by means of a key 9 to the screw shaft. The said clutch member 1 is, in addition to the engagement with the worm wheel 2, arranged to also engage with the coacting clutch portion of a gear wheel 10 of the other power transmission train, and which gear wheel is rotatably mounted in the said feed box 3. Both of the power trains, of which merely the worm wheel 2 and gear wheel 10 are shown, are driven preferably from the same source of power (not shown), as is well understood. A rotary cutter 11 is mounted in the carriage 5 to cut the work which may be mounted upon arbor 12 of the work-head 13 mounted upon the upper portion 14 of the frame 4.

The construction hereinbefore described is well known in the art and no claim to the same is made in the present application, which relates more particularly to the means for adjusting and controlling the position of the clutch member 1. For this purpose, the said member is formed with a grooved portion 15 which is in engagement with a projection 16 of a rock lever 17 mounted to oscillate on a shaft 18 supported in the casing 3. Projecting from said rock lever 17 and through the casing 3, is a stud 19 fitting a lost motion lever 20 also mounted on the shaft 18. The said lost motion lever 20, Fig. 5, is pivotally connected to a trip rod 21 which carries dogs 22 and 23, the same being adapted to engage an arm 25 depending from the cutter carriage 5.

Stud 19 is formed with a V- or otherwise suitably shaped portion 26 adapted to engage a lever 27 hingedly connected to the casing 3 and having a correspondingly shaped portion 29, Fig. 4. A roller 30 is carried by the lower end of the lost motion lever 20 and is adapted to engage the V- or otherwise suitably shaped portion 32 of a lever 33 pivotally connected to the casing 3 at one end and having its opposite end yieldingly secured to the said casing by means of a spring 35 tending to draw the said lever end upwardly. The said spring 35 through lever 33 is adapted to effect a quick change in the position of the clutch member 1, as will hereinafter be more fully set forth. To control the position of the said clutch member 1, a clutch control lever 38 pivotally secured to the casing 3, Fig. 4, is employed, and may be manually operated or shifted to three different positions. It is provided for this purpose with a cam shaped hole formed with three distinct sections at the lines 40, 41 and 42 corresponding to the three desired positions of the control lever. The stud 19 is adapted to fit the said cam shaped hole; and, at the line 40, the section is the narrowest and is adapted to hold the stud 19 and thereby the clutch member 1 in the inoperative or "stop" position. The section at line 41 is formed to be just wide enough to accommodate stud 19 to allow the clutch member 1 to engage the worm wheel 2 and also to retain the inoperative position. At the line 42, the section is the widest and permits the clutch member to attain the additional position for engaging the gear wheel 10. For convenient manipulation, the lever 38 is provided with a handle 43 and also with notches 44, 45 and 46 corresponding to the sections at the lines 40, 41 and 42 and whereby the lever may be locked in any of the desired positions through a bell crank 47, pivotally secured to the casing, and one arm of which is provided with a tooth 48 adapted to fit the said notches. The other arm of said bell crank is connected through a pin 49 and tension spring 50 with the lever 27. To properly indicate the respective positions of the control lever 38, an index plate 52, Figs. 2, 3 and 4, is secured to the casing 3, in position to match with an arrow 53 integral with the said lever; and the legends on the said index plate designate consecutively a stop position, a feed only position and a feed and return position.

In the operation of a milling or gear cutting machine, particularly in the "setting-up" of the machine, the control lever is thrown into the position feed only, which corresponds to the section along the line 41, Fig. 4. This will cause the clutch member 1 to engage with the worm wheel 2, causing the cutter to be fed through the work until the arm 25 of the cutter carriage 5 strikes dog 22, whereupon rod 21 will pull the lost motion lever 20 in the direction of the carriage until the roller 30 is over the cutter carriage side of the apex of the V-shape portion 32 of lever 33. The clutch member 1 is thereby drawn out of engagement with the said worm wheel 2 into the inoperative position. The dog 22 may then be readjusted, if necessary, to provide the desired relative positions of cutter and work. When thus correctly set, the control lever 38 is thrown into the position feed and return (as shown in the drawings) corresponding to the section along the lines 42. Spring 35 will then rapidly pull lever 33 upwardly and thus force over the roll 30 and its lever 20, throwing thereby the clutch member 1 into engagement with the gear wheel 10. The latter rotates in direction opposite to that of the worm wheel 2 and at a faster speed; and a quick return of the cutter carriage is therefore effected and until its arm 25 strikes the dog 23, whereupon the roller 30 is caused to again pass over the apex of lever 33 and the clutch member 1 is thrown into engagement with the worm wheel 2 for the cutting stroke. During the cutting and returning strokes, lever 27 and spring 50 act, through stud 19, to retain the sliding clutch member 1 in engagement with the respective worm wheel or gear wheel as the lost motion lever 20 is moved away from the said stud 19. Control lever 38 is retained simultaneously therewith, in the position of the cam shaped opening to which it has been set, by means of the spring 50 acting upon the bell crank 47 to cause its tooth 48 to engage with the corresponding notch. The spring 50 thus performs the double function of retaining the control lever 38 and the sliding clutch member 1 in their proper positions during the period of feeding and returning. The arrangement of a hinged lever 33 for the purpose of effecting a rapid change from one clutch member to the other is more effective than the piston plunger arrangement heretofore employed in similar machines, being without the excessive friction present in said piston plunger arrangement when the pressure of operating is upon either side of the apex of the V-shape portion. Moreover, the arrangement herein set forth permits a ready observation of the spring 35 under operating conditions, thereby rendering it possible to easily guard against spring failure.

We claim:—

1. In a clutch controlling mechanism including suitable clutch members, one of which is slidable; means to adjust said slidable member; a member for controlling said adjusting means and provided with three clutch positioning portions; and means for holding said controlling member in any of the said positioning portions.

2. In a clutch controlling mechanism including suitable clutch members, one of which is slidable; means engaging said slidable clutch member to adjust the same; means for holding said clutch engaging means; a clutch positioning member; and means simultaneously retaining in position said clutch positioning member and said means for holding said clutch engaging means.

3. In a clutch controlling mechanism including suitable clutch members, one of which is slidable; means engaging said slidable clutch member to adjust the same; means for holding said clutch-engaging means; a clutch positioning member provided with a plurality of clutch positioning portions and with notches corresponding thereto; a bell crank, one arm of which is adapted to engage the notches of said positioning member; and a spring connected to the other arm of said bell crank lever and to said means for holding the clutch engaging means.

4. In a clutch controlling mechanism including suitable clutch members, one of which is slidable: means engaging said slidable clutch member to adjust the same; a member projecting therefrom and having a V-shape notch thereon; a lever provided with V-shaped portion engaging said V-shape portion; a clutch positioning lever provided with a plurality of clutch positioning portions and with notches corresponding thereto; a bell crank, one arm of which is provided with a suitable tooth adapted to engage the notches of said clutch positioning lever; and a spring connected to the other arm of said bell crank lever and to said lever engaging the V-shape portion of the projecting member.

5. In a clutch controlling mechanism including suitable clutch members, one of which is slidable: means engaging said slidable clutch member to adjust the same; a stud extending therefrom; a clutch positioning lever engaging said stud; a holding lever engaging said stud; a holding lever engaging said clutch positioning lever; and resilient means connecting said holding levers.

6. In a clutch controlling mechanism including suitable clutch members, one of which is slidable: means engaging said slidable clutch member to adjust the same; a stud extending therefrom; a lost motion lever engaging said stud, and means for oscillating the same; a spring drawn oscillatory lever in engagement with said lost motion lever; a clutch positioning member for controlling said slidable clutch member and provided with a plurality of clutch positioning portions; and means for holding said positioning member in any of the desired positions.

7. In a clutch controlling mechanism including suitable clutch members, one of which is slidable: a clutch positioning lever having a cam shape portion of three distinct sections and adapted to control said slidable clutch member; means for retaining said lever in operative position with respect to any of said sections; and suitable indicating means for the said sections.

8. In a clutch controlling mechanism including suitable clutch members, one of which is slidable: two gears adapted to be engaged by the slidable member; a clutch positioning lever having a cam shape portion of three distinct sections, the first section being adapted to allow of engaging the said slidable clutch member in an inoperative position, the said second section to allow of engaging the said slidable clutch member with one of said gears, and the third section to allow of engaging the slidable clutch member with the other of said gears.

Signed at Newark, in the county of Essex, and State of New Jersey, this 20th day of November, A. D. 1913.

FRANK E. EBERHARDT
HENRY J. EBERHARDT.
U. SETH EBERHARDT.

Witnesses:
CARLES L. MEYER,
J. E. FELDMAN.

Copies of this patent may be obtained for five cents each, by addressing the "Commissioner of Patents, Washington, D. C."